(No Model.)

B. J. LESLIE.

PLIERS OR PINCHERS.

No. 380,331. Patented Apr. 3, 1888.

Witnesses.
G. W. Bogart.
C. D. Kert.

Inventor.
Benjamin J. Leslie.
By W. C. Hosea.
Atty.

UNITED STATES PATENT OFFICE.

BENJAMIN J. LESLIE, OF BUTLER, KENTUCKY.

PLIERS OR PINCHERS.

SPECIFICATION forming part of Letters Patent No. 380,331, dated April 3, 1888.

Application filed February 21, 1887. Serial No. 228,359. (No model.)

*To all whom it may concern:*

Be it known that I, BENJAMIN J. LESLIE, a citizen of the United States, residing at Butler, Kentucky, have invented new and useful Improvements in Pliers or Pinchers, of which the following is a specification.

My invention relates to that class of "pinchers" ordinarily designated as "pliers," referring more particularly to that variety in which the clamping action is in or approximately in the median longitudinal plane of the gripping-handles and pivot, its object being to enhance the utility of such implements by the addition thereto as a permanent feature of construction of a self-adjustable fulcrum-piece, as hereinafter more fully set forth.

My invention is illustrated in the accompanying drawings, in which—

Figure 1:
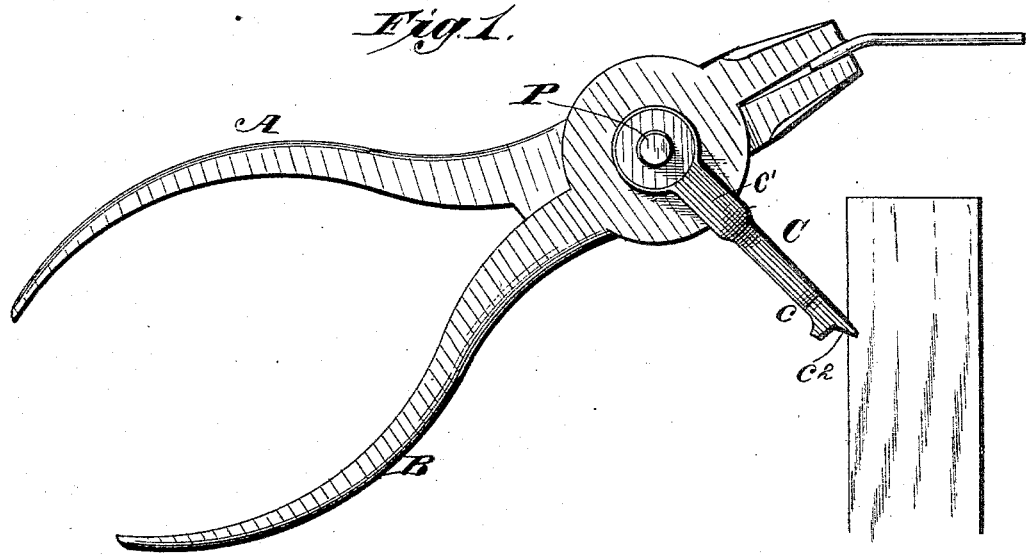
Figure 3:
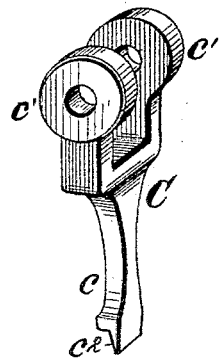
Figure 2:
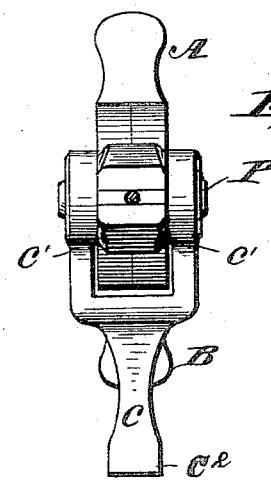

Figure 1 is an elevation of the implement complete, represented as in use. Fig. 2 is a front or end view of the same; Fig. 3, a perspective view of the adjustable fulcrum-piece detached.

Referring now to the drawings, A and B designate, respectively, the two pivoted members constituting the implement commonly known as "pliers."

In Fig. 1 the implement is shown in one of its ordinary and most useful functions—to wit, in the act of stretching a wire over a post. With reference to this and kindred uses the implement is provided with a yoke-piece, C, constructed and attached as follows: The yoke-piece consists of a stem, $c$, constituting the fulcrum proper, bifurcated above into two perforated arms, $c'$, constituting a yoke adapted to extend at either side of the head of the pliers and engage with and upon the pivot P, which connects the two members A B. The lower end of the stem $c$ is brought approximately to an edge, $c^2$, which may serve the purpose of a screw-driver, and, moreover, forms a more extended bearing-edge for the pivotal action of the fulcrum. The edge $c^2$ is preferably arranged as coincident with and terminating the front side of the stem $c$, as shown, and immediately behind and above the said edge the stem is thickened into an offset, constituting an abutment or stop to prevent the fulcrum-piece from embedding itself too deeply in the wood when the implement is used, as indicated in Fig. 1, for tensioning wire in fences and the like. The fulcrum thus provided has a free pivotal movement through a considerable arc, and by way of illustration of the utility thus conferred upon the implement by the addition of the pivoted fulcrum it will be seen upon reference to Fig. 1 that by bearing downward upon the implement the edge $c$ of the fulcrum-piece will bed itself in the side of the post, and the wire will be stretched and brought down on the top of the post, where it may be secured in any convenient manner.

The operation of the device will of course vary according to the special use made of it in a given case, of which the foregoing is an illustration. Other uses will be obvious without mention.

I claim as my invention and desire to secure by Letters Patent of the United States—

1. In combination with a pair of pliers of the character described, a yoke-piece secured to the ends of the pivot and constituting a movable fulcrum, and having its lower end flattened in the plane of the pivotal axis to an approximate edge to give an extended bearing for the fulcrum and constitute also a screw-driver, substantially as set forth.

2. In combination with a pair of pliers, a yoke-piece secured as a fulcrum to the ends of the pivot, flattened to an approximate edge at its opposite or bearing end, and thickened above said edge into an offset or shoulder, substantially as and for the purpose set forth.

In testimony whereof I have hereunto set my hand in the presence of two subscribing witnesses.

BENJAMIN J. LESLIE.

Witnesses:
L. M. HOSEA,
C. D. KERR.